United States Patent
Sacks et al.

(10) Patent No.: US 7,143,041 B2
(45) Date of Patent: Nov. 28, 2006

(54) METHOD FOR OBJECT SELECTION

(75) Inventors: Jerry Dennis Sacks, Houston, TX (US); James Michael Parks, Richmond, TX (US); Donald Paul Pry, Sugar Land, TX (US)

(73) Assignee: System Application Engineering, Inc., Houston, TX (US)

( * ) Notice: Subject to any disclaimer, the term of this patent is extended or adjusted under 35 U.S.C. 154(b) by 553 days.

(21) Appl. No.: 10/736,369

(22) Filed: Dec. 15, 2003

(65) Prior Publication Data

US 2004/0138781 A1 Jul. 15, 2004

Related U.S. Application Data

(60) Provisional application No. 60/436,080, filed on Dec. 23, 2002.

(51) Int. Cl.
*G10L 21/06* (2006.01)

(52) U.S. Cl. .................. 704/270; 704/275

(58) Field of Classification Search .............. None
See application file for complete search history.

(56) References Cited

U.S. PATENT DOCUMENTS

| | | | |
|---|---|---|---|
| 5,991,719 A * | 11/1999 | Yazaki et al. ............... 704/251 |
| 6,837,436 B1 * | 1/2005 | Swartz et al. ........... 235/472.02 |
| 7,063,263 B1 * | 6/2006 | Swartz et al. ........... 235/472.02 |
| 2003/0020629 A1 | 1/2003 | Swartz .................. 340/825.25 |

\* cited by examiner

*Primary Examiner*—Susan McFadden
(74) *Attorney, Agent, or Firm*—Buskop Law Group PC; Wendy K. Buskop

(57) ABSTRACT

The invention is a method for objects selection at a location comprising the steps of using a mobile computer having a bar code reader, a display, an audio output device, an audio input device, a tactile input device, text to speech software, a voice recognition software, objects selection applications software, and radio frequency identification (RFID) reader, wherein said mobile computer is adapted for communication between an order systems server and a user and the order systems server is adapted for communication between the mobile computer and at least one external computer system.

13 Claims, 18 Drawing Sheets

| | | |
|---|---|---|
| | Selector Pro 3:12p ok | |
| | Aisle Summary | |
| 250 — | Aisles: 12    Qty | — 256 |
| 252 — | AA* 70 | — 254 |
| 252a — | AB 5 | — 254a |
| 252b — | BB 18 | — 254b |
| 252c — | BC* 4 | — 254c |
| 252d — | CA 16 | — 254d |

Figure 12

METHOD FOR OBJECT SELECTION

CROSS-REFERENCE TO RELATED APPLICATIONS

This application claims priority to copending U.S. patent application Ser. No. 60/436,080, filed Dec. 23, 2002, which is incorporated by reference herein.

FIELD OF THE INVENTION

The present invention relates to a method for selecting objects at a warehouse.

BACKGROUND OF THE INVENTION

Current methods for selecting object at warehouses are slow, and subject to error. Users also herein known as selectors or pickers who are responsible for gathering items in a warehouse tend to make mistakes in reading the orders, selecting the correct object, the correct quantity of objects or generally being too slow.

In traditional logistic systems, warehousing plays the roles of storing and distributing objects. However, under the pressures of changing requirements, large amounts of complex data are needed to meet the various requirements in a warehouse system to make it safer for the workers and quicker to select objects.

In each technology regarding logistic centers, the use of the automated storage retrieval system (ASRS) is the best solution. Presently in Taiwan, automated storage retrieval systems are mostly used in material warehouses or delivery warehouses in factories. The basic process of ASRS is very simple. The basic unit of stocking/shipping is the pallet. In shipping processes, no picking mode is needed, so ASRS is mostly used for storage. However, while an automated system is installed in a logistic center, the problem of integrating the storage interface and the picking interface is created. A need has existed for an easy way to provide data to workers on the floor concerning location of objects for the purposes of picking.

Before introducing in detail the capabilities of the system of the invention, the problems of the present warehouse system with its limitations include:
  a. the system needs to select objects manually, which often results in mistakes;
  b. if the warehouse personnel leave, no one knows where the object is located;
  c. while picking an object, individual personnel must decide if the item is the correct item to pick;
  d. while checking an object that is picked, individual personnel must decide if an item is picked mistakenly;
  e. the warehouse does not know on a real time basis the status of particular orders until all manual tickets are input for that day;
  f. on a real time basis, it cannot be determine which objects belong to which manufacturers;
  g. no real time inventory can be maintained;
  h. there is no reservation capability to hold back or "skip" picking certain items.

A need has existed to overcome the above problems the present invention has been designed to overcome these problems.

SUMMARY OF THE INVENTION

The invention relates to a method for object selection. A method for object selection at a location. The method uses a mobile computer having a bar code reader, a display, an audio output device, an audio input device, a tactile input device, text to speech software, voice recognition software, object selection applications software, a printer and a radio frequency identification (RFID) reader. The mobile computer is adapted for communication between an order systems server and a user, such as a warehouse person. The order systems server is adapted for communication between the mobile computer and at least one external computer system.

The first step of the method involves the user entering a user code and possibly a security password to log onto the mobile computer. Next, in some cases if the mobile computer is not trained to the voice of the user and the user has an unusual accent or way that some words are pronounced, it may be useful to train the computer using the voice recognition software. As a second step, the mobile computer provides instructions to the user from the object selection applications software using the text to speech software to the audio output device. The information includes information from the object selection applications software to the display, Next, a request is made to from the mobile computer to the order systems server to obtain a list of objects to be pulled. Using the applications software a summary of the objects to be pulled from the list. The summary is displayed on the display and the summary is provided using via the text to speech software to the audio output device.

The user can then acknowledge the summary using the tactile input device (the keyboard) or by acknowledging the summary by speaking into the audio input device (42).

The mobile computer then can instruct the user to go to an aisle using the text to speech software. Once at the aisle, the user can acknowledge the aisle using the voice recognition software The computer can then advise the user using the text to speech software to go to:
  i. a location of an object which is part of the list of objects;
  ii. a location of a case of objects; or
  iii. a location of an individual object.

The user can then acknowledge that the user is at the location using the voice recognition software; With the mobile computer, the user can:
  i. say the check digits for an object location into the audio input device;
  ii. scan the bar code of an object location using the bar code reader;
  iii. scan the bar code of a case of objects using the bar code reader;
  iv. scan the bar code of an individual object using the bar code reader;
  v. read the object location with the RFID reader;
  vi. read the case of objects with the RFID reader;
  vii. read the individual object with the RFID reader;
  viii. using voice recognition software to verifying the check digits for an objects location;
  ix. using the applications software to verify the barcode or RFID is for the objects location, case of objects or individual object.

Next, the text to speech software can be used to indicate the quantity of the objects needed via the audio output device to the user and the user can acknowledge the indicated quantity of the objects. The steps above can be repeated all objects on the list have been selected. Next an acknowledgement can be made to the order systems server the results of the process steps and results from the order systems server can be transferred to the at least one external computer system

BRIEF DESCRIPTION OF THE DRAWINGS

The present invention will be explained in greater detail with reference to the appended figures, in which:

FIG. 12 is an aisle summary screen cable in the method of the example.

The present invention is detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention will become more fully understood from the detailed description given herein below. However, the following description is for purposes of illustration only, and thus is not limitative of the invention.

The invention relates to a method for selecting objects at a location herein also referred to as a warehouse using a variety of techniques, including voice recognition software and text to speech software loaded on a handheld or mobile computer, an audio output such as a speaker on a headset, and audio input, such as a microphone on a headset, and communication software which enables the handheld computer to communicate with a host server and a warehouse based management computer. Also the preferred method contemplates using a handheld computer, such as a palm computer with a radio frequency identification reader.

The invention provides a warehouse system with optimal management flow. The invention transforms the workflows of warehouses to improve objectivity and reduce the organization's working capital.

The invention is a method for use in a warehouse to track and assist in the management of people who work in the warehouse and select of "pick" the goods at a warehouse. Through various data capture techniques, for example, using an optical or electric scanner or bar code machine for reading data, objects data and "picked objects data" can be managed in real-time to avoid the previous problems of warehouse system management.

A preferred embodiment of the invention is disclosed to illustrate the practicality of the invention. It should be noted that most objects use a tagging system of some kind, visual, bar codes or radio frequency identification (hereafter "RFID") tags. However not all manufacturers can supply a standard. Warehouse personnel must be able to use a variety of objects identification devices to track no only objects, but also their location in a warehouse.

Figure 1:
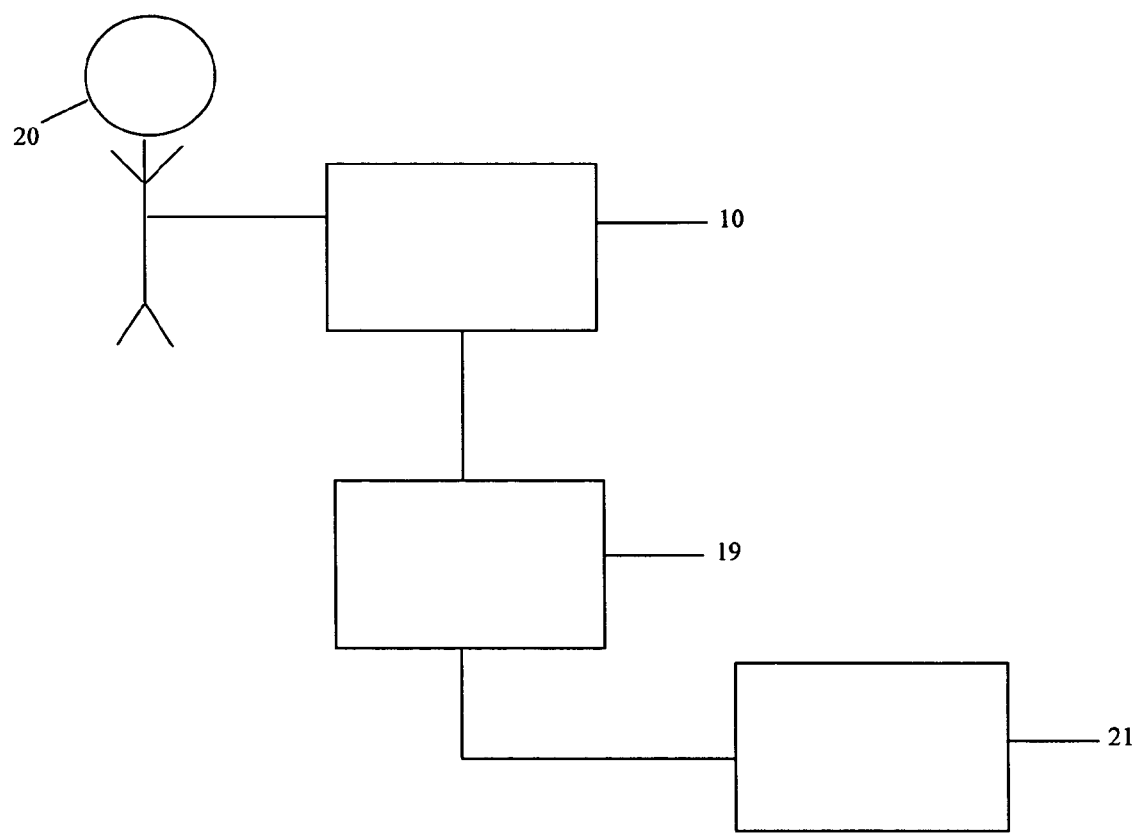
FIG. 1 is a diagram of an overview of the system for use by the method of the invention.

FIG. 1 shows the mobile computer (10) communicates between an order systems server (19) and a user (20), such as a "picker" or "objects locator" person who traditionally is a warehouse employee. The order systems server is adapted for communication between the mobile computer (10) and at least one external computer system (21).

Figure 2:
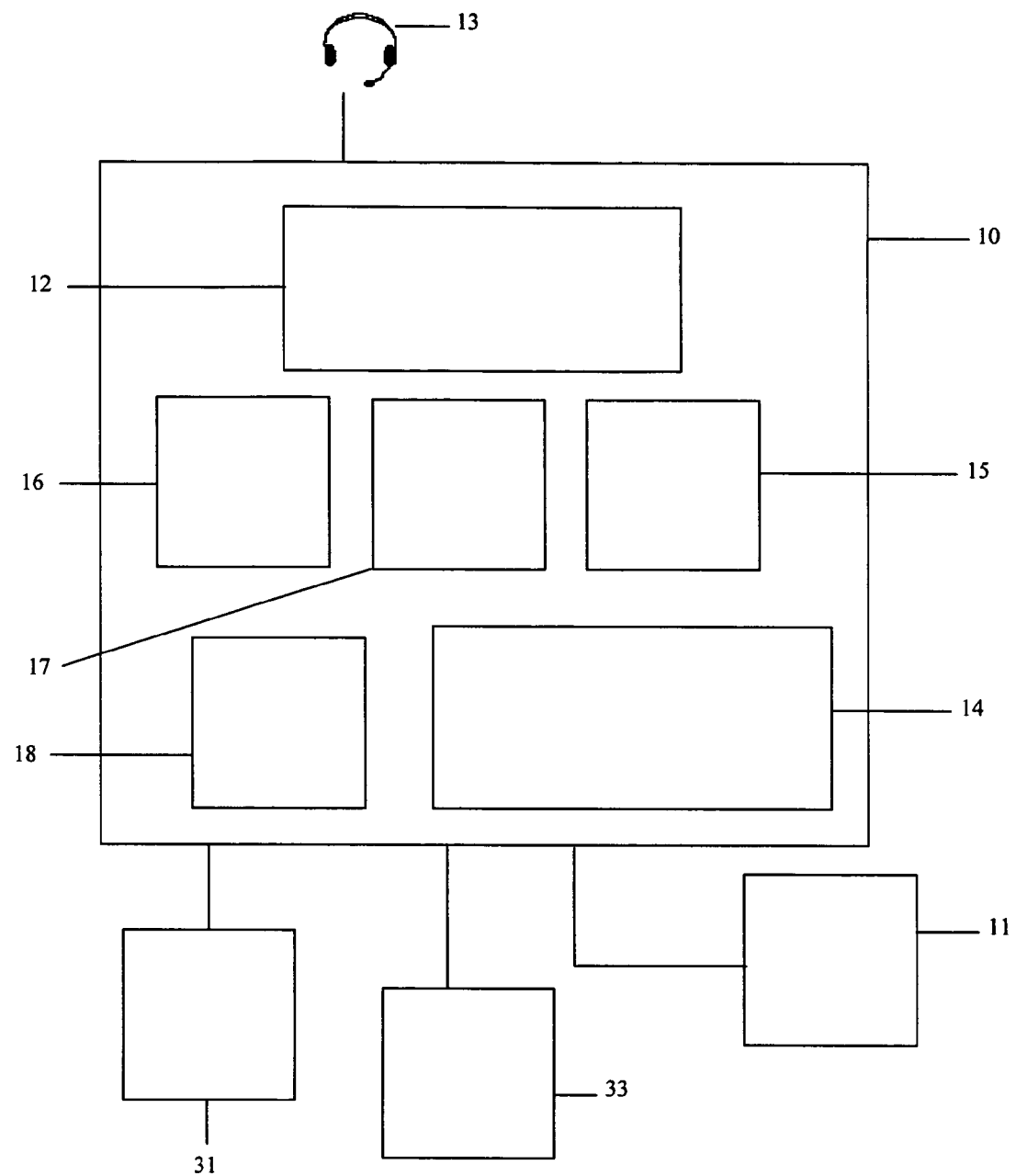
FIG. 2 is a diagram of the mobile computer and accessories used in the inventive method and the software stored thereon.
Figure 3:
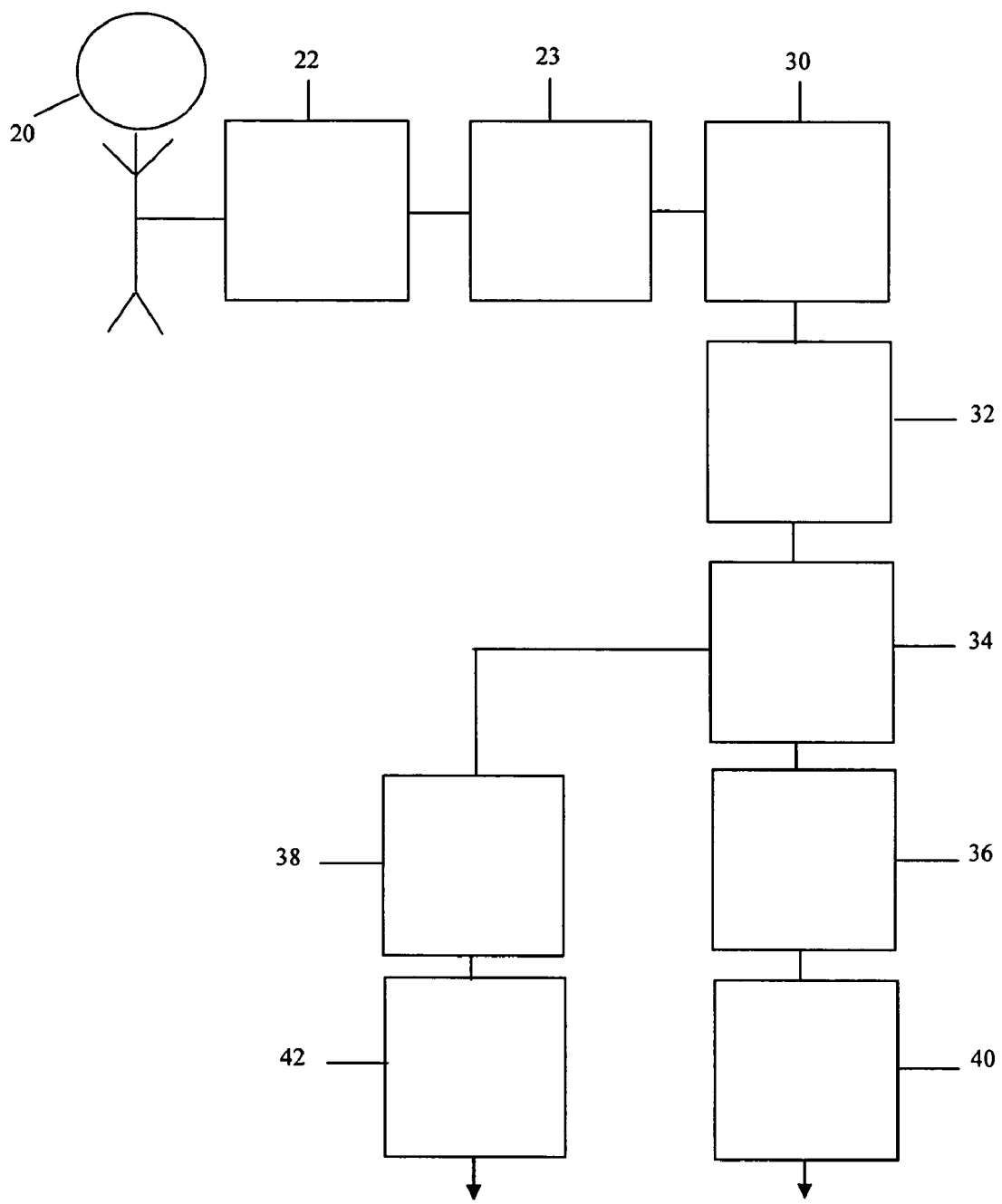
FIG. 3 is a diagram of the steps involved in the method of the invention.
Figure 3:
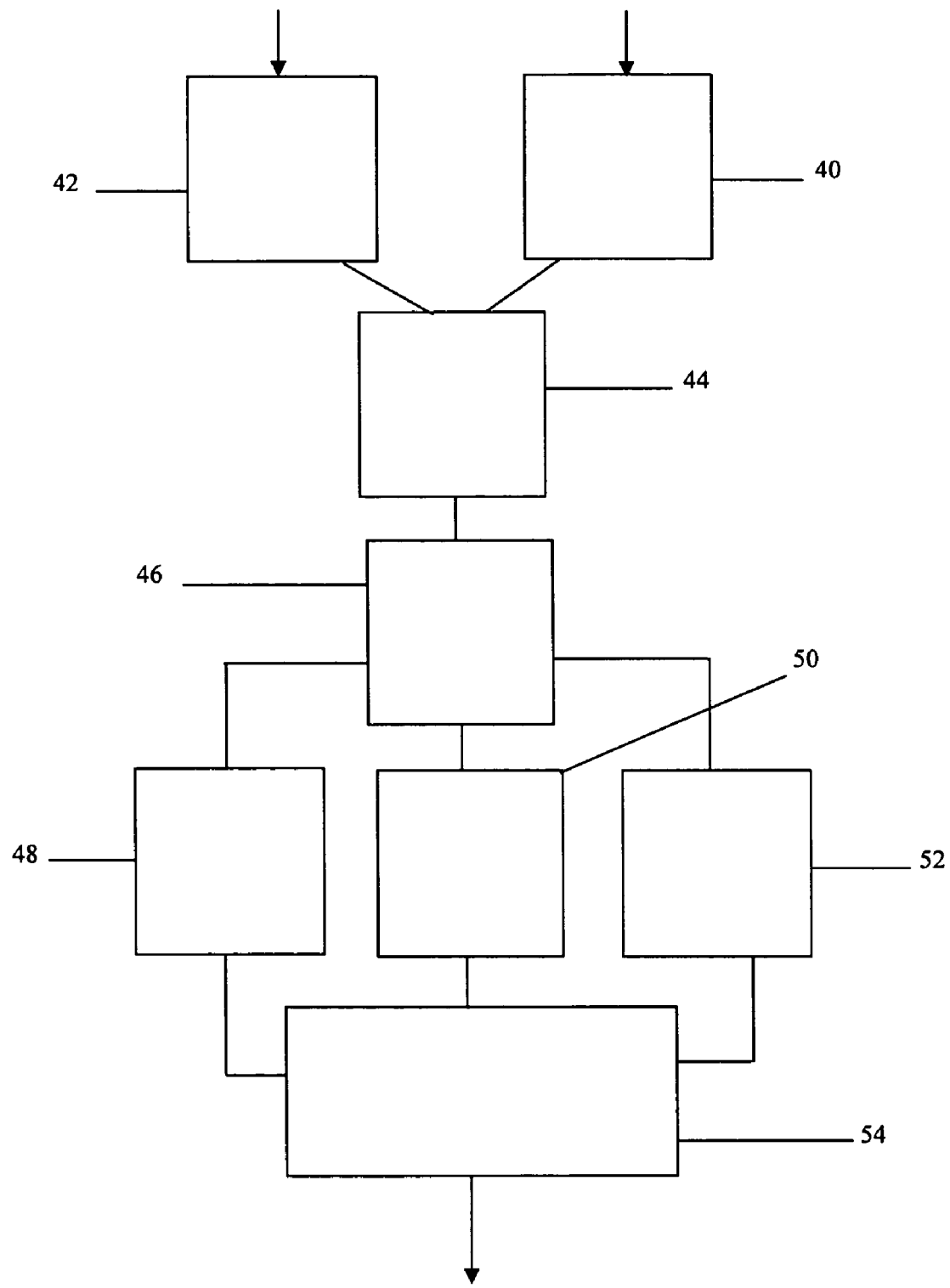
Figure 3:
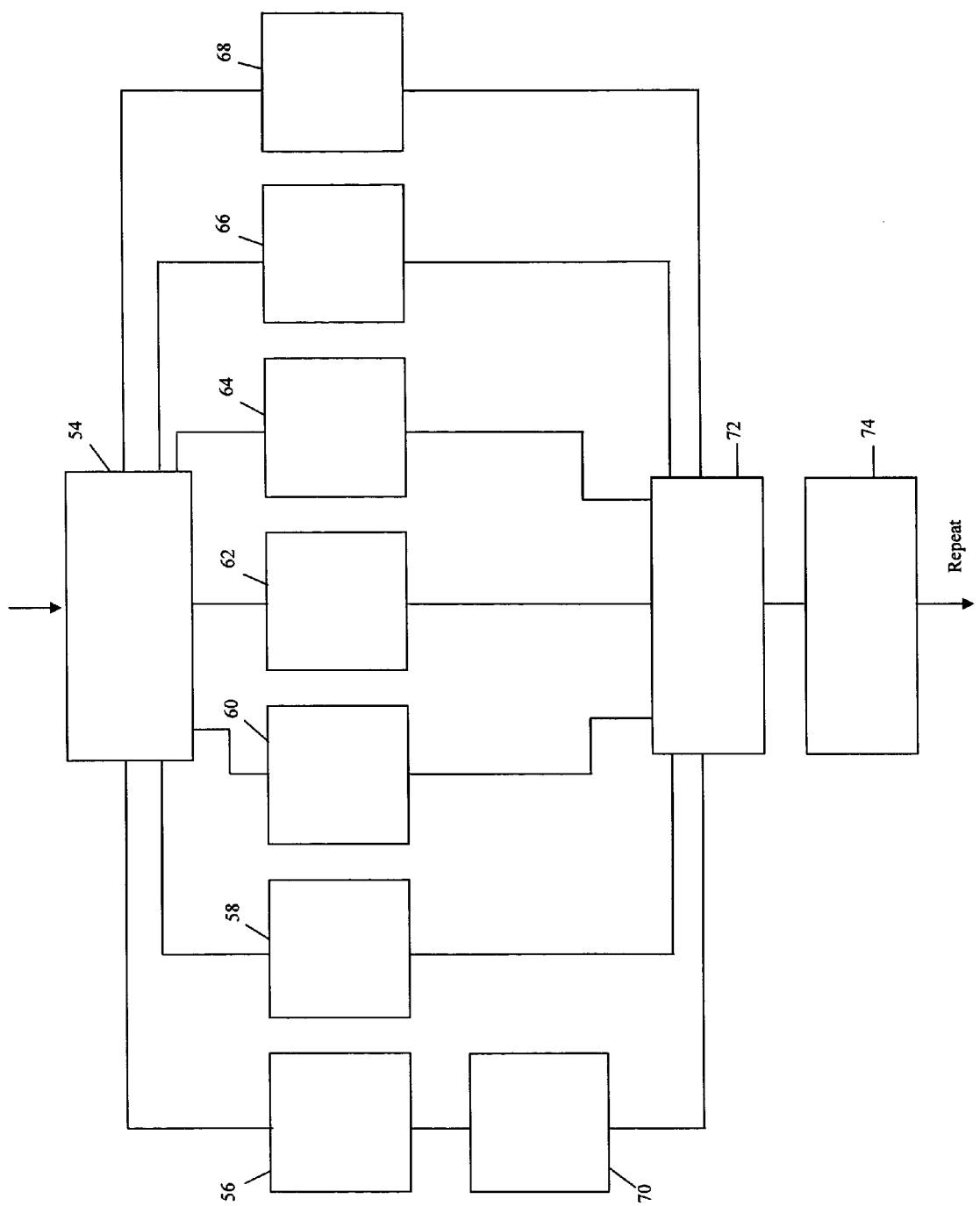
Figure 3:
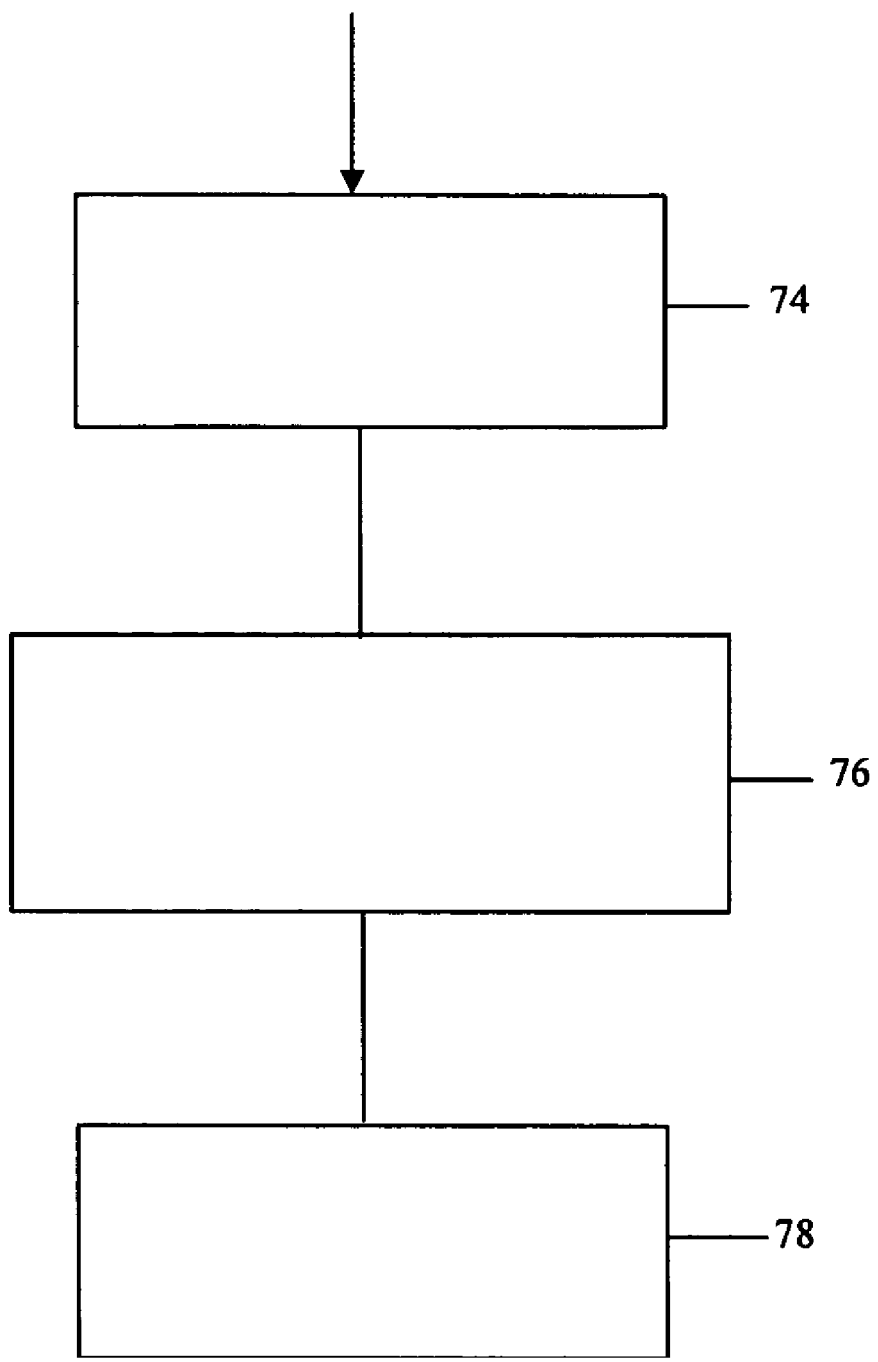

The method for objects selection at a location uses equipment and software shown in more detail in FIG. 2. In particular the method can most preferably use a mobile computer (10) having a bar code reader (11), a display (12) an audio output device (13), an audio input device (31), a tactile input device (14), text to speech software (15), a voice recognition software (16), objects selection application software (17), a printer (33), and a radio frequency identification (RFID) reader (18). A typical mobile computer usable within the scope of this invention would be a handheld computer, such as PDT8146 available from Symbol Technologies. The barcode scanner can be a scanner that is part of the mobile computer or a wireless scanner, CRS-1-20000-00 or wireless Bluetooth Ring Scanner available from Symbol Technologies. A typical audio output device and audio input device could be a headset, such as the VR3344 Headset, single ear available from Knowles Acoustics. The mobile computer is preferably wearable, such as with a holder part no. 11-53814-01 also available from Symbol Technologies. The voice recognition software can be. The text to speech software can be RealSpeak Solo Software from ScanSoft, Inc. A typical wireless communication radio for the mobile computer is a Bluetooth Connection Kit consisting of the CompactFlash I/O Bluetooth Card, Type I provided by Socket Communications. The communication network, which would enable the handheld computer to communicate with the host server in a wireless mode would be the Spectrum24 wireless network available form Symbol Technologies. A typical printer usable in this invention would be a QL320 wireless Bluetooth Printer from Zebra Technologies, Inc.

To initiate the method, the user (20), or warehouse person first enters a user code (22) and security password to log onto the mobile computer. The user code and security password can be entered through retinal scanning, through use of biometrics such as reading of a fingerprint, or by the more traditional method of simply inputting the code and password on the keyboard, or tactile input device of the mobile computer.

Next the log in code of the user is compared to prior log in codes used on the mobile computer, such as a Symbol PDT8100 computer to see if the user has used this mobile computer before. If the user has not used this mobile computer, then the mobile computer may prompt the user to use the voice recognition software resident on the mobile computer to train the system for more accurate use by the user (23). This training is especially useful if the user has a strong accent or does not pronounce some words clearly.

Next, instructions (30) are provided to the user from the objects selection applications software using the text to speech software to the audio output device. In most cases, the mobile computer essentially speaks to the user via a headset giving instructions on what to do next. In a preferred embodiment, objects information is provided from the objects selection applications software to the display of the mobile computer as well.

A request (32) is then transmitted from the mobile computer to the order systems server (18) to obtain a list (34) of objects to be pulled or selected at the warehouse. Using the applications software, a summary (36) of the objects to be pulled is generated from the list of objects to be pulled. The summary is then presented on the display (36). In addition to providing the summary on the display, the summary is provided using via the text to speech software, which then provides output via the audio output device.

The user can then acknowledge the summary using the tactile input device (40) by depressing the enter key on the keyboard and tapping OK on the touch screen of the mobile computer, or by acknowledging the summary using the audio input device (42), such as by saying "ready" in the microphone of a headset connected to the mobile computer.

The computer can then advise the user to go to a certain aisle (44) using the text to speech software. Once at the aisle, the user can acknowledge that he or she is at the aisle (46) using the voice recognition software by saying "ready" or some other appropriate response.

The mobile computer then advises the user using the text to speech software to go to either a location of objects, which is part of the list of objects (48); a location of a case of objects (50); or a location of an individual object (52).

Once the user is at location (48, 50, or 52), the user can acknowledge that the user is at the location using the voice recognition software (54). At the designated location, the user, with the mobile computer, can input one of the following:

i. the check digits for an object location (56) by the user using voice recognition software;
 ii. the bar code of an object location (58) by the user using the bar code reader;
 iii. the bar code of a case of objects (60) by the user using the bar code reader;
 iv. the bar code of an individual object (62) by the user using the bar code reader;
 v. the object's location with the RFID reader (64);
 vi. the case of objects with the RFID reader (66); or
 vii. the individual object with the RFID reader (68).

Using the voice recognition software, the user can verify the check digits for an objects location (70).

Using the applications software, the mobile computer can verify the barcode or RFID is for the object location, case of objects, or individual object.

Using the text to speech software, the mobile computer can then indicate the quantity (72) of the objects needed via the audio output device to the user, such as by speaking "select 20 cases" which means, the computer can tell the user to select 20 cases of that particular objects identification. The user can then acknowledge the indicated quantity of the objects (74) and the above steps can be repeated until all objects on a list have been selected by that user.

When the objects have been selected, the user can provide an acknowledgement (76) to the order systems server the results of the entire process steps; and the results can then be transferred from the order systems server to at least one external computer system (78).

In another embodiment of the invention, the preferred acknowledgement word is "ready" or "ok".

The method described above can be used to obtain status information concerning the user's performance, and compare specific individual performance to those of others in that warehouse, in similar warehouses of the same company, or to some other standard. These comparisons can be carried out by comparing the user's time to the expected completion time for steps (b) through (r), for example.

Figure 4:
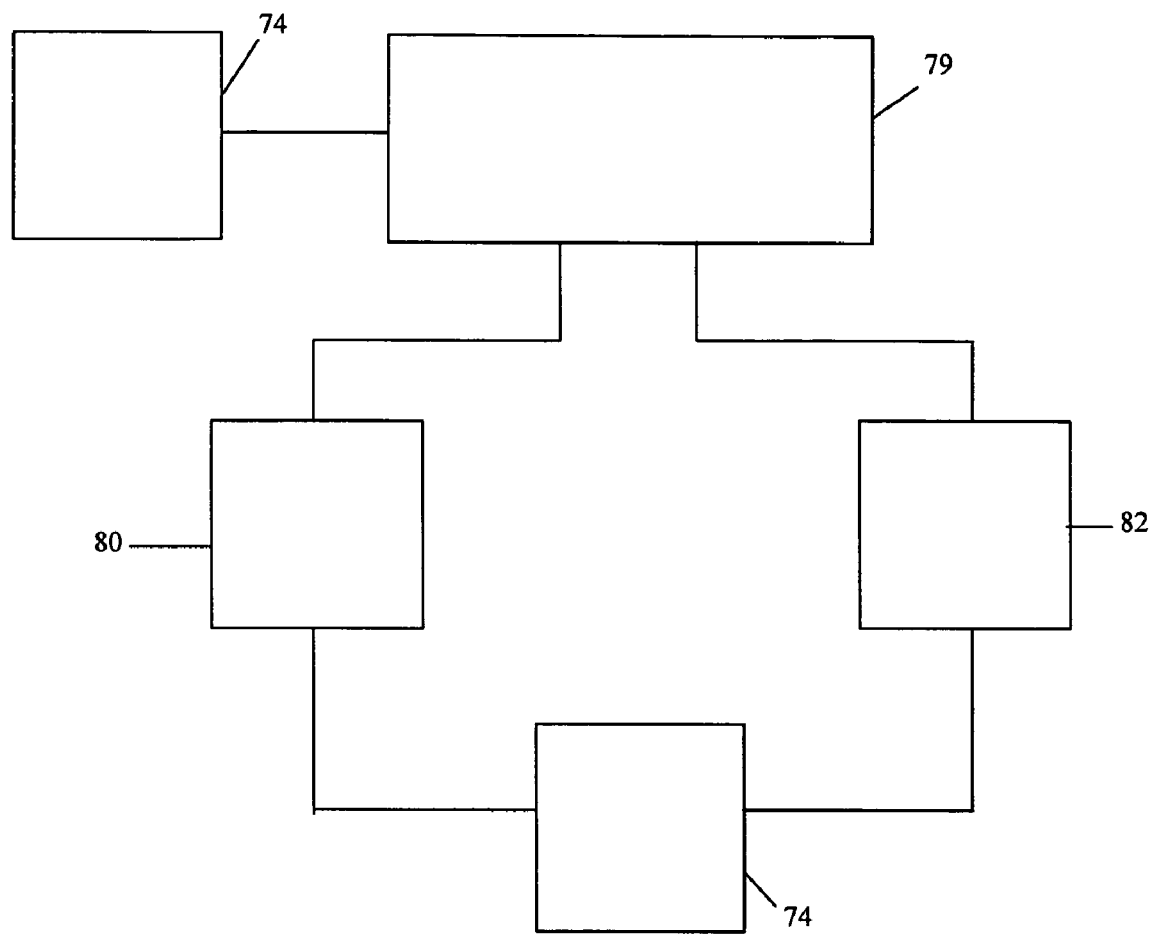
FIG. 4 is a diagram of the steps involved in the pick short method.

The method has as an embodiment, shown in FIG. 4, that if an indicated quantity of the objects is less than the quantity of objects to be pulled, the user can uses the voice recognition software to indicate a need to "pick short" the indicated amount (79). After the user indicates the need to "pick short" the indicated amount, the order filling applications software via the text to speech software can prompt the user to provide an input on the following:

a. the actual quantity of objects pulled (80); and
 b. the reason for the lack of quantity (82).

Figure 5:
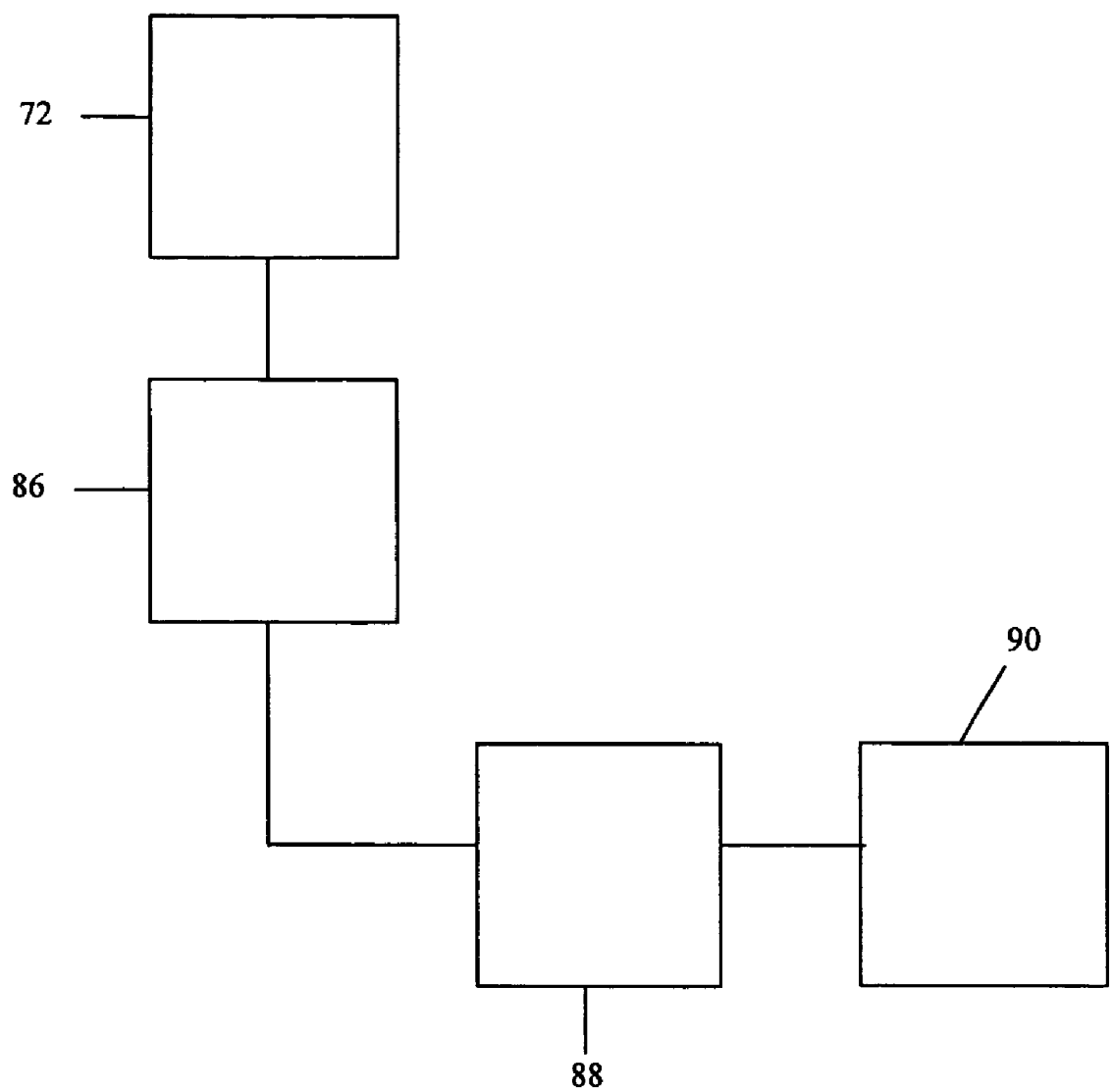
FIG. 5 is a diagram of the steps involved in the catch weight process of the method.

The method can include the step, shown in FIG. 5, of alerting the user using the text to speech software that an object to be pulled is a "catch weight item" (86). For catch weight items, the user should indicate the weight of the catch weight item using the audio input device (88), such as by saying "three, zero, zero ready" for a 300 pound item, into the microphone of the headset. The weight of the catch weight item can then be verified using the text to speech software (90) confirming to the user on how to handle the item.

Figure 6:
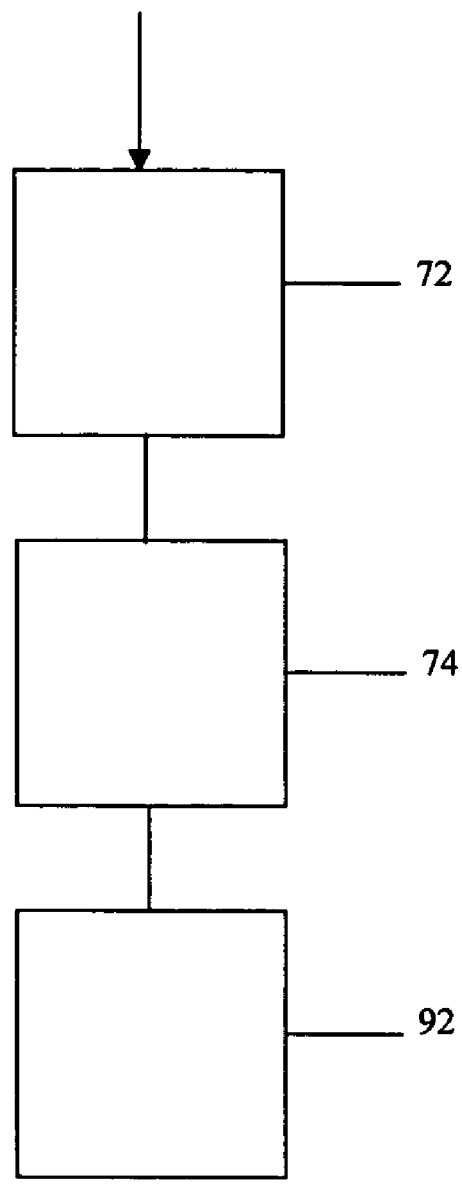
FIG. 6 is shows the skip aisle process involved in the invention.

The method can include the step, shown in FIG. 6, of having the mobile computer tell user which transport device, such as a particular pallet "A" or pallet "B" is to be used, and a position on the transport device, such as first, second quarter of the pallet and how many objects, or particularly where the quantity of the objects (74) to be pulled should be placed on the pallet (92).

In still another embodiment, the method contemplates an additional step in the case of "high quantity items". The method contemplates that the mobile computer can provide a "high quantity item" alert via the display to the user after the summary information is provided to the user.

The method is contemplated to have a safety step. The method has the mobile computer asking the user for answers to a series of safety questions regarding a transport vehicle that moves the transport device such as:

a. are the brakes working of the transport vehicle?;
 b. is the horn working?;
 c. is the steering working?;
 d. is there any damage to the transport vehicle, such as damaged wheels?,
 e. are there any leaks to the system of the transport vehicle, such as are there oil leaks?;
 f. are the tires inflated?; and
 g. are the forks undamaged?.

The invention contemplates as a step that at any time during the method, a second user can contact the user from a remote location via the order systems server, which communicates with the mobile computer, which then provides the communication via audio output device and display.

The following is an example of one use of the Novel System.

EXAMPLE 1

The method can use a system, which consists of two components that function as an integrated system by communicating to each other via a radio system. The specific components involved are shown in FIG. 7.

The order system server (OSS) (19) that serves as the communications hub and data depository. It also provides the communications interface an external computer system (21) also known as a warehouse management system (WMS). The OSS runs on any one of several computer systems running the Windows NT or Unix operating system.

The voice directed mobile computer (MC) (10) consists of a belt-mounted computer with a headset and microphone. Although the MC has a display screen and keyboard, they are not required for MC operation. All prompts are announced through the headset and all commands are spoken into the microphone. The MC also has an integrated spread spectrum radio for communication to the OSS. The MC may also include an optional laser scanner or bar code label printer. The optional laser scanner is worn on the back of the hand and used to scan the bar code identifying a slot. The optional bar code printer is worn on the belt with the MC computer. The printer is used to print case and pallet labels. The MC provides the selector with assignment information, accepts and validates the selector's responses, announces corrective action messages, stores entered data and performs the required radio communications to the OSS and belt-mounted printer.

Figure 7:
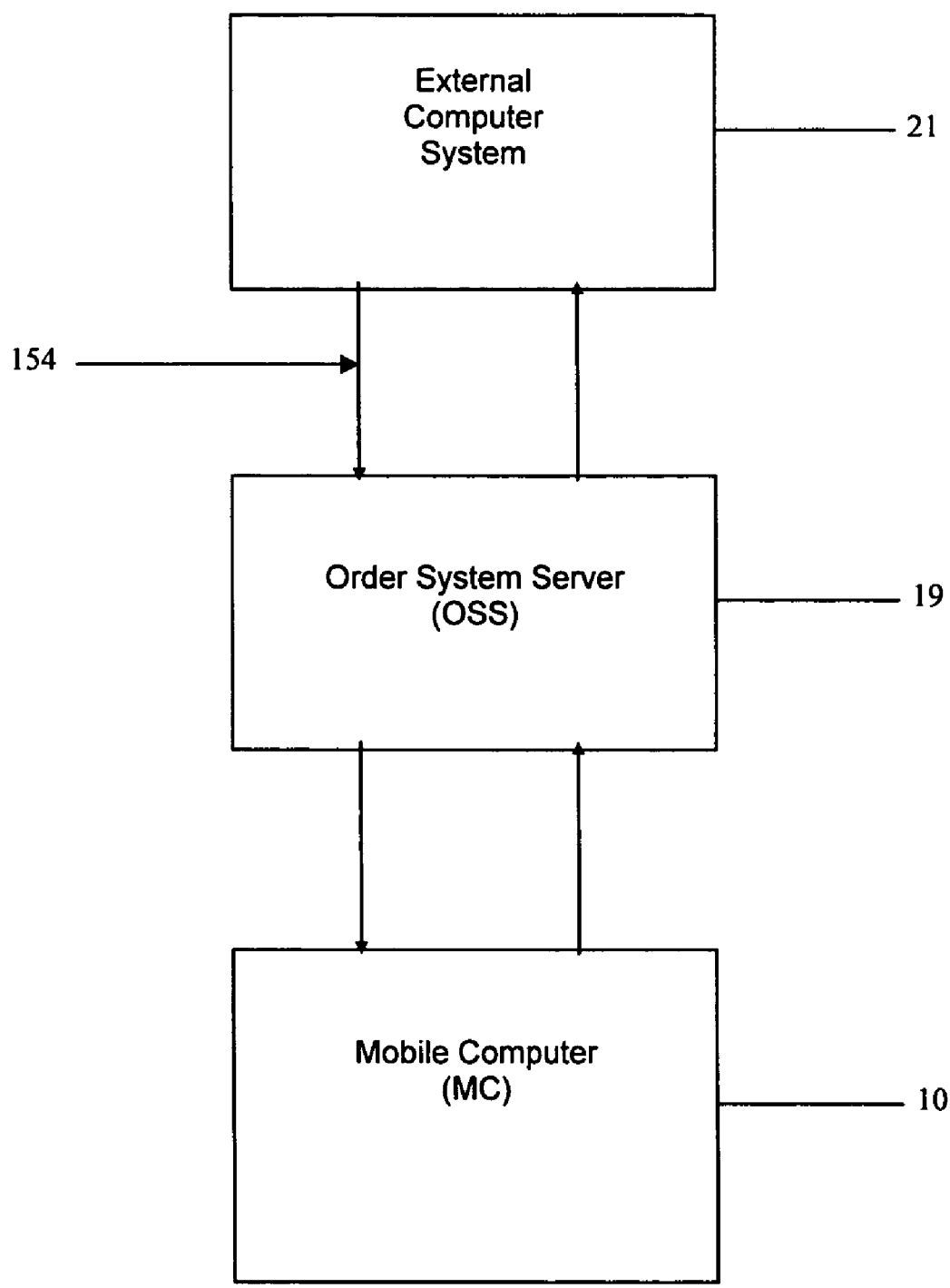
FIG. 7 is an overview of the system of the example.

FIG. 7 provides an overview of the data flow in the invention. The OSS obtains groups of assignments (154) for selection from an external computer system (21). When requested, an assignment is communicated to the MC that sequentially directs the selector, via the headset, to pick the items in the assignment. Using the headset and microphone, the selector chooses an aisle and is then directed to the slot(s) where the items to be picked are located. The MC announces the slot to pick and then waits for the selector to speak the check digits of that slot or scan the bar-coded slot ID using the laser scanner. While the MC is waiting for the selector to go to the slot, the selector may say several keywords in order to have the MC speak the product description, stop number, item number, UPC number or slot number. The selector confirms that he has arrived at the correct slot by speaking the check digits associated with that slot or scanning the slot ID bar code. If case label printing is enabled, the MC prints case labels for the items to be picked once the selector has confirmed he has arrived at the correct slot. The selector should pick the required number of cases and then say "ready" to indicate he has completed the pick and is ready to go to the next slot. If the item to be picked is a catch weight item, the selector is prompted to speak the weight of each item as it is picked and loaded onto the pallet. Since a case label for a catch weight item has the weight printed on it, a catch weight label is not printed until the selector has spoken the catch weight. Once the required number of items has been picked and the selector has said "ready", the MC directs the selector to the next slot or aisle so that the selector may pick the next item in the assignment.

If for some reason the selector cannot pick the required quantity from the slot, the selector has the option of indicating that he must pick short. If the selector indicates he is picking short, he is prompted for the actual quantity picked and the reason for the short pick. After entering the short information, the selector is directed to the next slot or aisle so that the selector may pick the next item in the assignment.

Once all items listed on the assignment have been picked, the MC directs the selector to go to the door where the assignment is to be loaded. The processing of the assignment is now complete. The selector may now request another assignment, enter a delay period or log off the MC.

The initial training contemplated for the system involves the following.

When a s elector logs onto the MC, the user ID and security password are validated. Provided the user ID and security password are valid, an additional check is made to determine whether or not the user has voice-trained the system. If so, the MC is ready for use and the MC speaks the next appropriate prompt. However, if the user has not voice trained the system, the MC may announce that it is about to train the basic system vocabularies. The MC then prompts the user to speak each of the basic system phrases. This training process requires less than 5 minutes.

The MC then announces that it is beginning training and that the selector should say each word as it is displayed on the screen. The MC displays a group of basic system phrases (or words) one phrase at a time and waits for the selector to say that phrase.

Once the selector has spoken the phrase displayed on the screen, the MC displays the next phrase. This process continues until each of the basic system phrases has been displayed. When the last phrase has been spoken, the MC announces, "the training is done" and the MC proceeds to the next appropriate prompt.

While training the basic system phrases trains many of the words used by the MC, it is not contemplated to train all the phrases. The basic system phrases are those phrases that are common to many of the MC prompts. Other phrases exist that are only used at one or two prompts. For example, the phrase "pick short" may only be spoken at the pick quantity prompt. If the system is having difficulty understanding a certain phrase, the user may say "display menu" and train that particular word that is not being understood.

Figure 8:
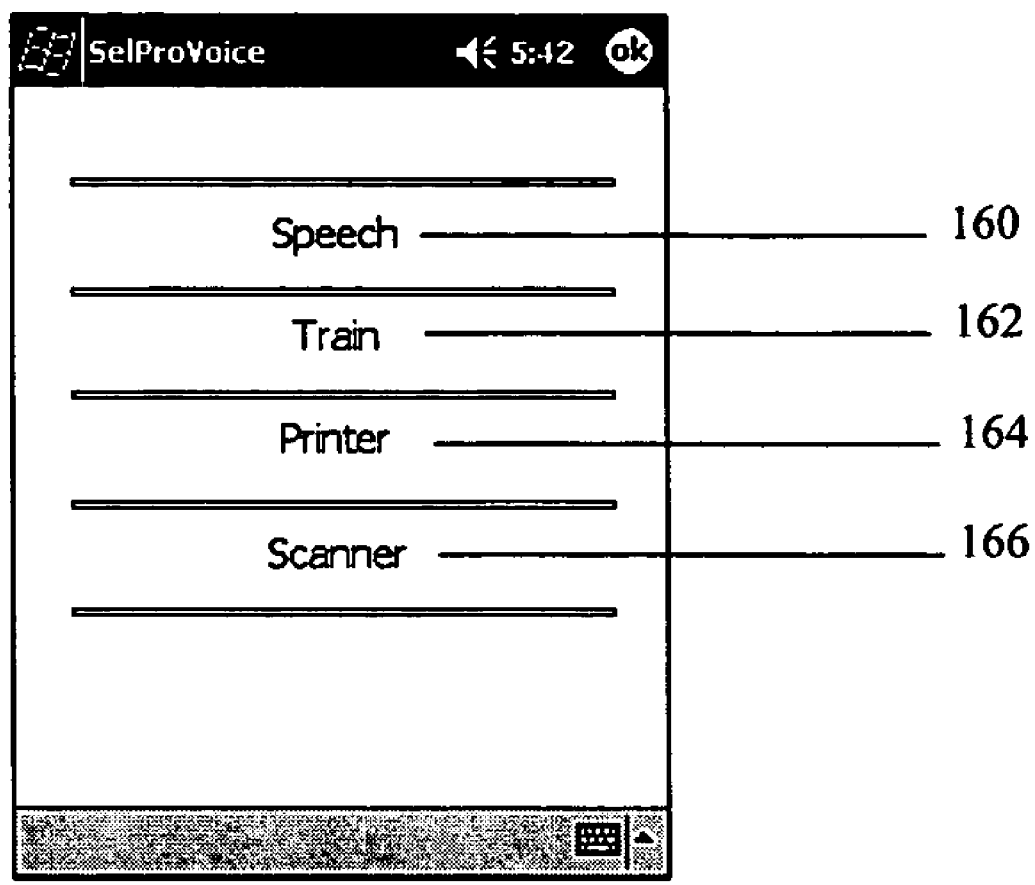
FIG. 8 is a display of the mobile computer configuration menu.

The system is contemplated to have a configuration menu, shown in FIG. 8, that will allow the selector to modify certain MC settings that were either automatically defaulted by the system or set up during initial system startup. The MC settings that may be modified include the sound of the MC voice, any previously trained word or phrase, the portable printer ID (if any) and the laser scanner ID (if any). In order to modify one of these MC settings, the selector should say, "display menu" while at most MC prompts. When the MC recognizes the "display menu" command, the MC displays the system configuration menu and prompts the selector to speak the desired menu function.

The selector may say one of the following four words to select the corresponding function:

"Speech" (160)—Allows the selector to modify the volume, speed and pitch of the MC voice.

"Train" (162)—Allows the selector to retrain a particular word or phrase.

"Printer" (164)—Allows the selector to change label printers. If the MC does not support a portable label printer, the MC announces, "There are no printers configured" and exits the system configuration menu.

"Scanner" (166)—Allows the selector to change laser scanners. If the MC does not support a laser scanner, the MC announces, "There are no scanners configured" and exits the system configuration menu.

Note, if the selector decides he does not want to perform any of the menu functions at this time, he may also say, "cancel" (or press the clear key) to exit the system configuration menu. When this is done, the MC repeats the prompt that was spoken before the selector said, "display menu".

Figure 9:
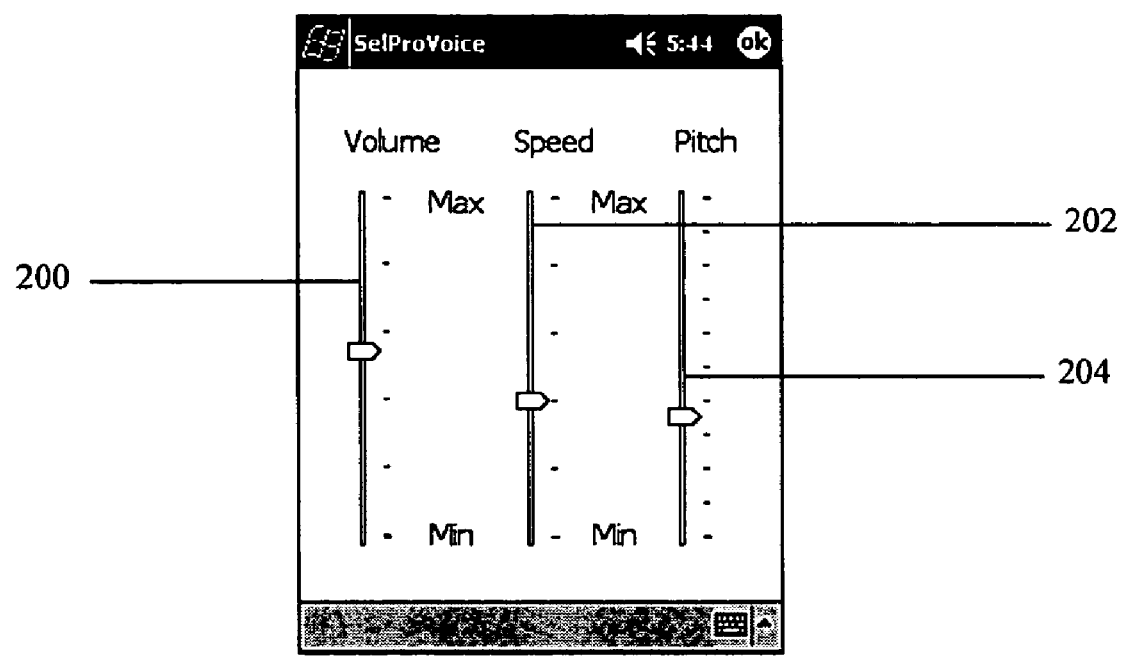
FIG. 9 is the speech configuration display.

When the MC is first started, the volume, speed and pitch of the MC voice are either set to the default values or to the last values selected by the selector. The system configuration menu shown in FIG. 8 allows the selector to modify these parameters that control the MC voice. While the system configuration menu is displayed, the selector may say "speech" (160) in order to configure the MC voice. When the selector says "speech", FIG. 9 is displayed.

The selector may adjust the volume, speed and pitch by either taping the appropriate control on the screen or by speaking the appropriate control command. After a control is tapped or a control word is spoken, the MC makes the corresponding adjustment and then asks, "How is this?" using the adjusted MC voice. The selector may continue to tap the controls or speak the control words until the MC voice is the way he wants it. The selector should then say, "done" to indicate he has completed the MC voice adjustments. The selector may also say, "cancel" to discard any adjustments made to the MC voice. Once the selector has said "done" or "cancel", the MC returns to the prompt that was spoken before the selector said "display menu".

The following control words may be spoken in order to adjust the MC voice parameters:

Volume—Use the words "louder" and "softer" in order to increase or decrease the MC voice volume.

Speed—Use the words "faster" and "slower" in order to increase or decrease the speed of the MC voice.

Pitch—Use the words "increase" and "decrease" in order to increase or decrease the MC voice pitch, see FIG. 9.

FIG. 9 shows a volume switch (200), a speed (202) and a pitch (204) switch. These switches can be increased or decreased either using the touch screen on the MC or by using a voice command, increase volume.

Each selector can train the MC to understand his voice and speech patterns. These speech patterns represent the various words, phrases, numbers and alphabetic characters that the selector may have to say during the operation of the Selector Pro task. When the selector logs on for the very first time, the selector is prompted to voice-train the system. Once the selector has trained the system, it is not necessary to do so again. These speech patterns are recorded and saved on the host computer. When the MC changes selectors, the speech patterns for the new selector are loaded onto the MC. The MC can then recognize the commands and responses spoken by that new selector.

Figure 10:
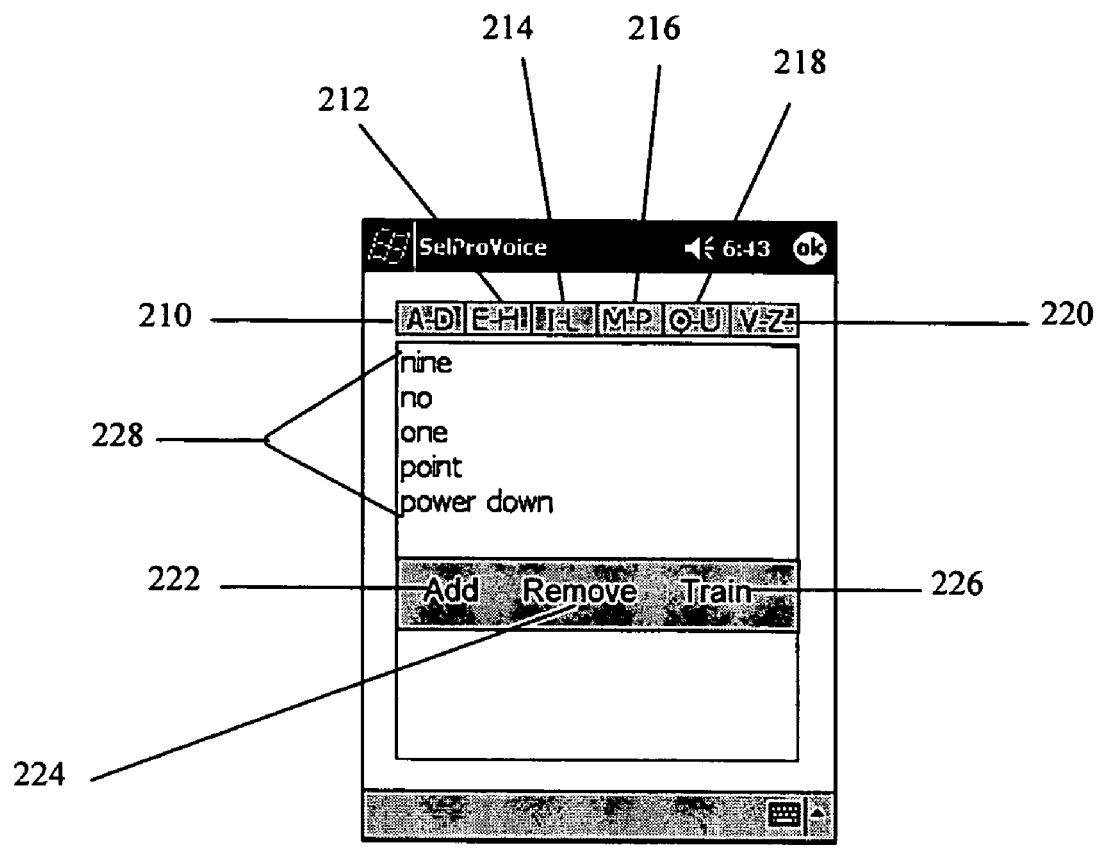
FIG. 10 is the retraining display.

If the MC ever has trouble recognizing any word(s) spoken by the selector, that word or words can be "retrained". When a word is retrained, the selector is prompted to say that word again. Once the MC has obtained a new voice sample, the speech pattern for that word or phrase is saved and reused the next time the speech patterns for that selector must be loaded onto the MC. Hopefully, by retraining the word or phrase, it will improve the ability of the MC to recognize the word the next time it is spoken. While the system configuration menu is displayed, the selector may say "train" (162) in order to retrain one or more words then another configuration screen is displayed, see FIG. 10. FIG. 10 has touch points (buttons) (210, 212, 214, 216, 218 and 220) that allow the user to select groups of words based on the alphabet characters shown on the touch points. The user can select from the displayed words (228) and use the operations touch points to add (222), remove (224) or initiate training (226), for the selected word or words.

The retraining screen allows the selector to select the word(s) to be retrained. Since there can be a large number of words from which to choose, the MC divides the words into small groups alphabetically. The headings at the top of the screen (e.g. A–D, E–H, etc.) indicate the group of words for that heading. The selector should tap the heading in which the word to be trained would be found. When a heading is tapped, the list of words that may be selected for training is displayed. The selector should tap on the word to be trained and then tap the 'add' button. If there is more than one word the selector would like to train, the selector should tap that word and then tap the add button again. The selector may tap any group heading and add words to be trained in any order. The user can tap the remove button to remove a word from the words to train list. Once the selector has built the list of words he would like to train, he should tap the 'train' button. When the train button is tapped, the MC announces that it is beginning training and that the selector should say each word as it is displayed on the screen. The MC displays each of the selected words one word at a time and waits for the selector to say that word.

When the last word to be trained has been spoken, the MC announces, "the training is done" and the MC returns to the prompt that was spoken before the selector said, "display menu". When the MC is first started, the selector is prompted to identify the portable label printer. During the course of the shift, the printer might malfunction or otherwise break requiring that the printer be exchanged with another. The system allows the selector to change printers anytime. While a menu is displayed, the selector may say "printer" (164) in order to associate the MC with a new label printer, as shown in FIG. 8.

The selector is prompted to select a printer from the dropdown list displayed on the screen. Tap the arrow on the dropdown list to reveal the list of supported printers. Now tap on the desired printer. If no printer is going to be used, the selector may select disable (which is always one of the choices). If the selector taps disable, the MC announces that "printing is disabled" and the MC returns to the prompt that was spoken before the selector said, "display menu". When printing is disabled, no label printing occurs.

Provided a valid printer was selected from the dropdown list, the MC prompts for the printer ID.

The printer ID is the combination of letters and numbers used to uniquely identify the printer. Usually there is a bar code label on the printer that contains this unique identifier. The identifier may be scanned in, keyed in or spoken. Once the identifier has been entered, the MC announces that it is "attaching to printer" and attempts to communicate with the printer to make certain that the printer ID is valid and the printer is operational. For this reason, the printer must be turned on before the printer ID is entered. If after several attempts the MC is unable to communicate with the printer, the MC announces that it cannot connect to the printer and prompts the selector to enter a new printer ID. The selector may reenter the printer ID and attempt to connect to the printer again. The selector may also say, "cancel" or press the cancel key to return to the prompt that was spoken before the selector said, "display menu". Note, if the selector cancels without connecting to the printer, no labels will be printed.

Provided the selector was successful connecting to the printer, the MC announces "the current printer is the <printer name>" and then returns to the prompt that was spoken before the selector said, "display menu".

When the MC is first started, the selector is prompted to identify the laser scanner. During the course of the shift, the scanner might malfunction or otherwise break requiring that the scanner be exchanged with another. A menu can be used which allows the selector to change scanners anytime. While the system configuration menu is displayed, the selector may say "scanner" (166) in order to associate the MC with a new laser scanner, as also shown in FIG. 8.

The selector is prompted to select a laser scanner from the dropdown list displayed on the screen. Tap the arrow on the dropdown list to reveal the list of supported scanners. Now tap on the desired scanner. If no scanner is going to be used, the selector may select disable (which is always one of the choices). If the selector taps disable, the MC announces that "scanning is disabled" and the MC returns to the prompt that was spoken before the selector said, "display menu". When scanning is disabled, the selector must identify each slot manually.

Provided a valid laser scanner was selected from the dropdown list, the MC prompts for the scanner ID.

The scanner ID is the combination of letters and numbers used to uniquely identify the scanner. Usually there is a bar code label on the scanner that contains this unique identifier. The identifier may be keyed in or spoken. Once the identifier has been entered, the MC announces that it is "attaching to scanner" and attempts to communicate with the scanner to make certain that the scanner ID is valid and the scanner is operational. For this reason, the scanner must be powered up before the scanner ID is entered. If after several attempts the MC is unable to communicate with the scanner, the MC announces that it cannot connect to the scanner and prompts the selector to enter a new scanner ID. The selector may reenter the scanner ID and attempt to connect to the scanner again. The selector may also say, "cancel" or press the cancel key to return to the prompt that was spoken before the selector said, "display menu". Note, if the selector cancels without connecting to the scanner, the selector must identify each slot manually.

Provided the selector was successful connecting to the scanner, the MC announces "the current scanner is the <scanner name>" and then returns to the prompt that was spoken before the selector said, "display menu".

Figure 11:
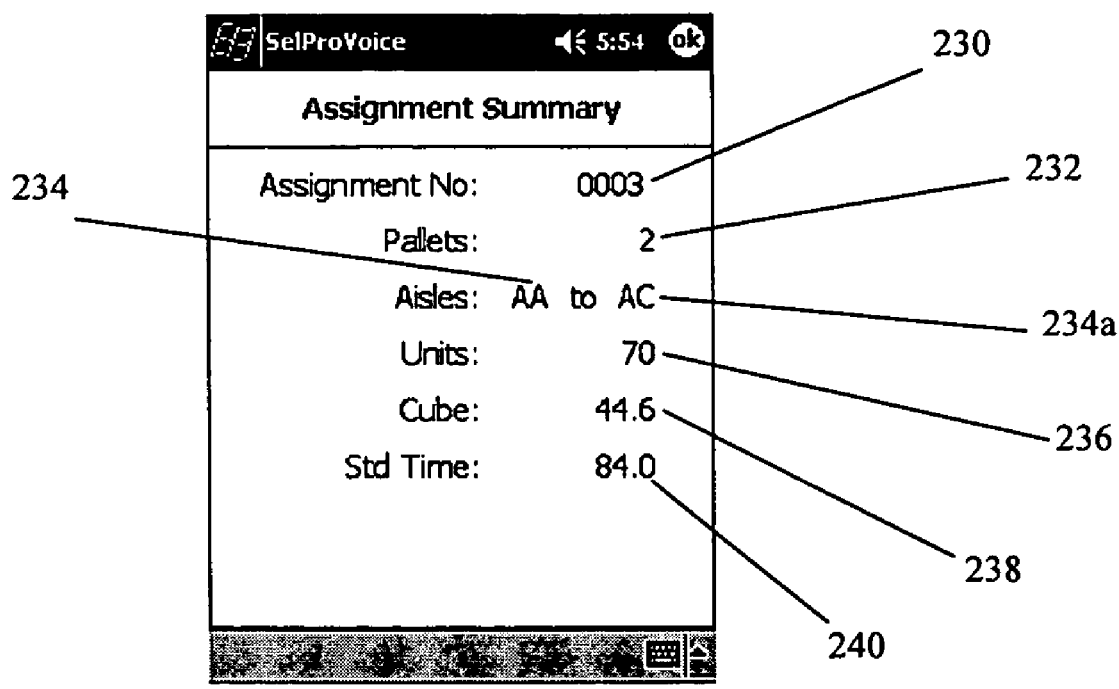
FIG. 11 is a total cubic footage screen as referenced on the example.

In one embodiment, once the assignment is successfully received, the MC can announce the total cubic footage in the assignment and the standard time to complete the assignment, see FIG. 11. FIG. 11 presents information on:

Assignment number (230);
Transport devices (pallets) required (232);
Aisles from which objects will be selected (234 and 234*a*);
Number of objects to be selected (236);
The cube or volume of all of the objects to be selected (238); and
The standard time or expected time for completion of the objects selection (240).

This prompt provides overall information regarding the assignment that was just received. The selector should say "ready" to begin picking the assignment.

After an assignment has been received, the MC checks to see if there are slots that have a pick quantity that exceeds the specified high quantity pick count or if there are items that have been identified as base items. If so, the MC asks the selector if he would like to hear a description of the high quantity (or base) items. If all the slots in the assignment have pick counts that are below the specified high quantity pick count, the MC skips the high quantity prompts and proceeds directly to the aisle selection prompt. Provided there is at least one high quantity pick, the MC makes the following announcement, "There are {Number of Hi qty picks} high quantity picks." Do you want to hear a description of these items?}. When the selector is asked if he would like to hear a description of the high quantity items, they are automatically displayed on the MC screen. The screen displays the slot number, the quantity to pick and the product description for each high quantity or base item. The selector may review this screen rather than listening to a description of each item. The selector should indicate whether or not he wants to listen to a description of the high quantity picks by saying "yes" or "no". If the selector says "yes", the MC announces the high quantity items. If the selector says "no", the MC bypasses announcing the high quantity items and asks if the high quantity items should be picked now.

The MC instructs the selector as to which aisle to go to. The MC instructs the selector to go to the aisles in the order in which the pick information is received from the OSS. When the MC is ready for the selector to go to an aisle or change aisles, it makes the following announcement, "Aisle {aisle number}."

The MC screen displays each of the aisles in the assignment shown in FIG. 12 and the quantity of items to pick down that aisle. FIG. 12 shows the aisles and quantities of objects to be selected, more specifically, the display shows:

The total number of aisles from which objects will be selected (250);
A list of the specific aisles from which the objects will be selected (252, 252*a*, 252*b*, 252*c* and 252*d*);
The specific quantity of objects that are to be selected from each aisle (254, 254*a*, 254*b*, 254*c* and 254*d*); and
Scroll touch points that allow scrolling of the aisles and quantities data, up (256) or down (258) if the list does not fit on the display.

If the aisle has slots with high quantity picks, an asterisk (*) is displayed to the right of the aisle number. Note, although the MC screen displays each of the aisles in the assignment, the selector is not allowed to select an aisle from this screen. This screen is merely a list of the remaining aisles in the assignment for review purposes only. As an aisle is completed, it is removed from this list. When the MC instructs the selector to go to an aisle, the selector should go to the indicated aisle and then say "ready". Once the selector has indicated that he is at the start of the aisle and ready to pick that aisle, the MC instructs the selector as to which slot to go to first.

It is possible that for some reason the selector cannot or does not want to pick the indicated aisle next. If so, the selector may say "skip aisle". If the selector indicates that he wants to skip the aisle, the MC asks the selector if he is sure, "You said skip aisle. Are you sure?". The selector should confirm whether he wants to skip the aisle or not by saying "yes" or "no". If the selector says "no", the MC simply repeats the Go To Aisle prompt and waits for the selector to say "ready". If the selector says, "yes" confirming that he wants to skip the aisle, the MC skips the current aisle and proceeds to announce the next aisle to pick using the Go To Aisle prompt. If the selector wants to skip that aisle as well, he may again say "skip aisle" and proceed to the next aisle in the assignment. Note, the MC prompts the selector to go to each aisle in the order in which the aisles were received from the OSS. When an aisle is skipped, the MC continues to the next aisle that follows the skipped aisle. If the selector skips the last aisle, the MC returns to the first aisle in the assignment. However, the MC only returns to the aisles that have outstanding picks. If an aisle has been completed, the MC does not return to that aisle. Thus, once the MC has prompted the selector to go to each aisle in the assignment, it returns to prompt the selector for just those aisles that were skipped or incomplete.

Once an aisle has been selected or after a slot has been picked, the MC instructs the selector as to which slot to go to next. The MC screen displays a list of the remaining slots to be picked down the aisle. As each slot is picked, it is removed from the list. Using this screen, the selector may review the number of slots to pick on the aisle and their pick quantities. Note, the selector may not go to any slot shown on the list but must instead go to the announced slot. Once the selector arrives at the slot, the selector must say "ready". The MC then prompts the selector to confirm he is at the correct slot. There are two methods in which the selector may confirm he is at the correct slot. The MC is pre-configured to support only one of these two methods. In the first method, the s elector must say the check digits assigned to that s lot. In the second method, the selector must scan the bar code that identifies the slot (or the product in the slot). The MC prompts the selector to go to the appropriate slot and waits for the selector to say "ready" indicating he has arrived at the slot.

Once the selector has arrived at the slot and said "ready", he must confirm he has arrived at the correct slot. The process of confirming the selector has arrived at the correct slot differs depending on whether the MC is using the check digit method or the laser scanner method.

The check digits are a two-digit number (00 through 99) used to distinguish one slot from another. Even numbered check digits are used on one side of the aisle while odd numbered check digits are used on the other. Depending on the number of slots on the aisle, it may be necessary to reuse the same check digits more than once down the aisle. However, the algorithm used to generate the check digits ensures that the check digit values are not reused until all the check digits available for that side of the aisle have been assigned. Thus, no two adjacent slots or slots in the same proximity of each other will have the same check digits.

Figure 13:
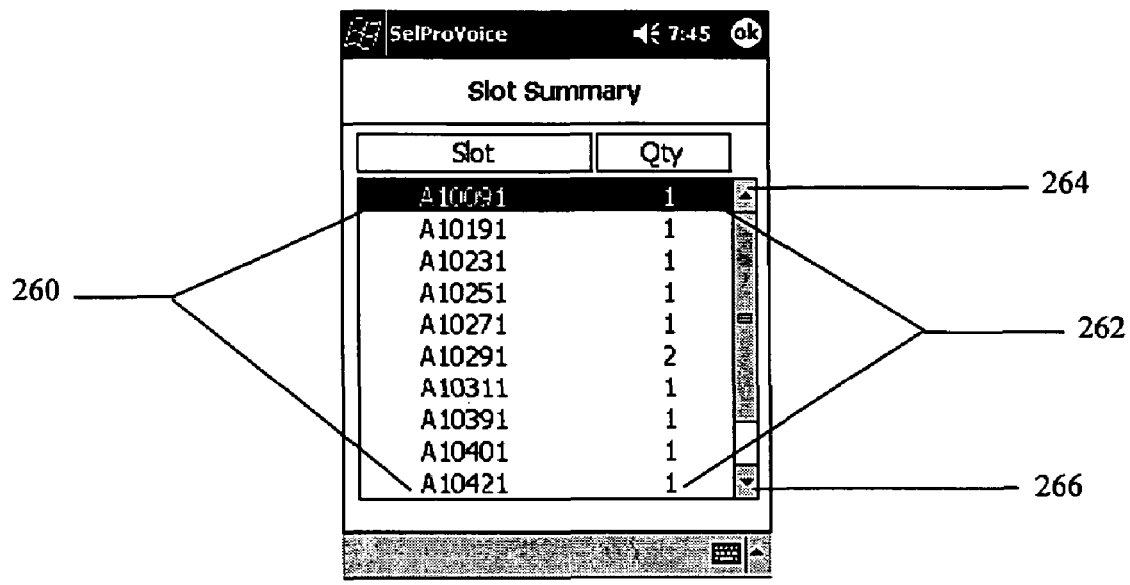
FIG. 13 is a slot summary screen as used in the example.

Using the check digit method, the selector is instructed to go to "Slot xxxx" as shown in FIG. 13. When the selector arrives at the slot (but not before), the selector should say "ready". The MC then says, "check digits". The selector should say the check digits for the slot. Note, the selector needs only to say the 2-digit check digits. It is not necessary to say "ready" after speaking the check digits since the MC is waiting for a 2-digit response. If the check digits are incorrect, the MC informs the selector and prompts for the check digits again. Provided the selector speaks the correct check digits, the MC prompts the selector to pick the required quantity, see FIG. 13. FIG. 13 shows the location (slot) summary display, which shows a list of slots (260) and the specific quantity of objects (262) that are to be selected from each slot. The display also has up (264) and down (266) touch points that allow scrolling the lists if required.

Note, while the MC is waiting for the selector to verify he is at the correct slot, the selector may also say, "cancel" and return to the go to slot prompt.

For those MC equipment sets that include a laser scanner or RFID reader, the selector is prompted to go to the required slot of FIG. 13. When the selector arrives at the slot (but not before), the selector should say "ready". The MC then says, "identify slot". At that point, the selector should scan the bar code label of that slot or the MC could read the RFID for the slot. Note, some installations allow the selector to scan the bar code on the product or the case. The selector should check with the warehouse supervisor to determine which bar code or codes may be used to confirm that he is at the correct slot. If the selector should scan an incorrect bar code, the MC informs the selector that the bar code is invalid and then re-prompts the selector to scan slot again. Provided the selector scans a correct bar code, the MC prompts the selector to pick the required quantity, of FIG. 12. Note, while the MC is waiting for the selector to scan the correct slot bar code, the selector may also say, "cancel" and return to the go to slot prompt.

If the selector is using the laser scanning method (described above) and is unable to scan the bar code label, he may manually identify the slot by saying "override". When the selector says, "override", the MC asks the selector if he is sure, "You said override. Are you sure?". If the selector says "no", he is re-prompted to scan slot. If the selector indicates that he wants to manually identify the slot, the MC prompts the selector to say the last 3 digits of the slot number, "Enter the last 3 digits of the slot ID."

The selector should speak the last 3 digits of the slot number and then say "ready". If the digits entered do not match the last 3 digits of the slot number, the MC issues an error message and then prompts the selector to enter the last 3 digits of the slot number again. If the selector wants to terminate this process, he may say "cancel" to return to the go to slot prompt. If the 3-digit value spoken by the selector is correct, the MC prompts the selector to pick the required quantity just as if the slot bar code had been scanned using the laser scanner.

While at the go to slot prompt, the selector may say "skip slot". It is possible that for some reason the selector cannot or does not want to pick the indicated slot. If so, the selector may say "skip slot" and go to the next slot on the aisle. If the selector indicates that he wants to skip the slot, the MC asks the selector if he is sure, "You said skip slot. Are you sure?". The selector should confirm whether he wants to skip the slot or not by saying "yes" or "no". If the selector says "no", the MC simply repeats the go to slot prompt and waits for the selector to confirm he is at the correct slot. If the selector says, "yes" confirming that he wants to skip the slot, the MC skips the current slot and determines what to do next. In most cases, this means going to the next slot on the aisle or going to the next aisle in the assignment. Note, the MC prompts the selector to go to each slot in the order in which they were received from the OSS. When a slot is skipped, the MC continues to the next slot that follows the skipped slot.

While the MC is waiting for the selector to confirm he is at the correct slot, the selector may also say "backup" in order to return to a skipped slot (on the current aisle). If there are no skipped slots for the current aisle, the MC simply repeats the go to slot prompt and continues to wait for the selector to confirm he is at the correct slot. Provided there was a slot that was skipped, the MC announces the go to slot prompt for that slot and waits for the selector to confirm that he has arrived at that slot. As previously indicated, the selector may only use the backup command when a slot has been skipped and while the selector is picking slots on that aisle. Once the last slot has been picked on the aisle, the MC automatically prompts the selector to go to the next aisle. However, the selector may say "backup" at the go to aisle prompt to return to the previous aisle and thus pick any slots that may have been skipped.

Figure 14:
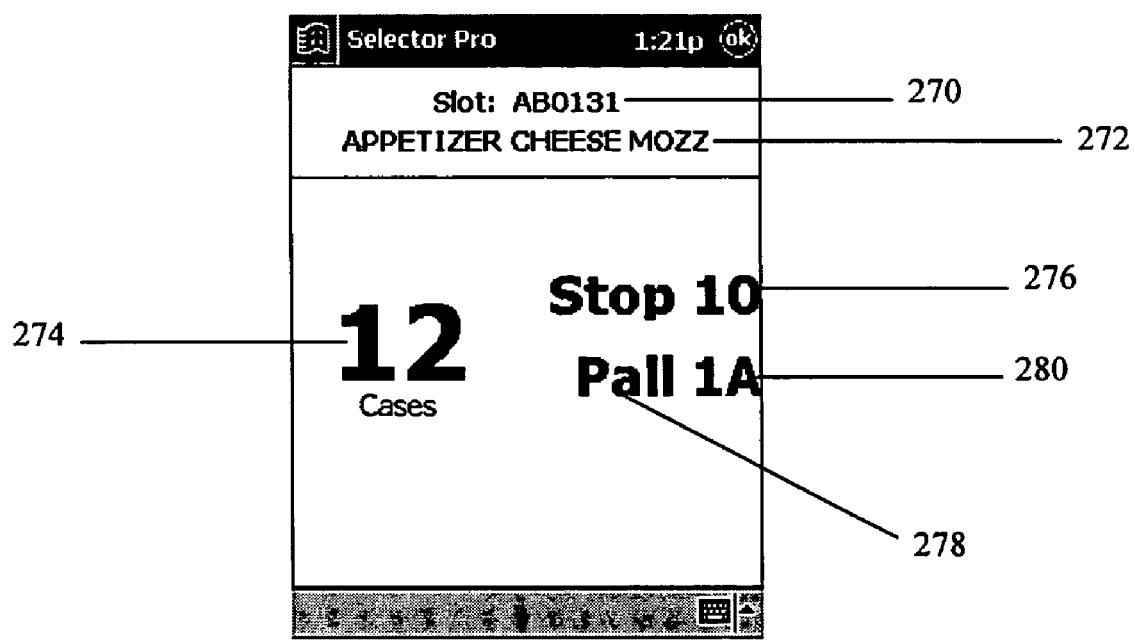
FIG. 14 shows an object selection screen of the example.

Once the selector has confirmed he is at the correct slot at the go to slot prompt, the MC prints the case labels for the items to be picked (if case label printing is enabled). The MC also announces the quantity to pick and the pallet number on which to place the items. This same information along with the product description and stop number is displayed on the MC screen shown in FIG. 14. The MC says, "Pick {number of cases to pick} cases. Pallet {pallet number}." FIG. 14 is the object selection display. This display provides the following:

The slot or location number (270) for the object to be selected;

The description (272) of the object to be selected;

The number of objects (cases) to be selected (274);

The stop number (276) where the objects selected will be delivered;

The transfer device (pallet) (278) or to which the objects selected are to be placed; and The location (quarter) (280) on the specified transfer device where the objects selected are to be placed.

If the selector is to pick eaches instead of cases, the MC says, "Pick xxx eaches". The selector should pick the required quantity and then say "ready" to indicate he is ready to go to the next slot. Once the selector has indicated that he has picked the indicated quantity, the MC must determine what to do next. That is, is there another selection on the same aisle, must the selector change aisles or have all the picks for the assignment been completed?

While the MC is waiting for the selector to indicate the pick has been completed, there are a number of keywords the selector may speak in order to obtain additional information regarding the pick. This information includes the current location (slot number), the stop number for the pick, the product description and the UPC number.

If there are multiple picks from the same slot (i.e. a multi-stop pick), the MC also announces the stop number for the pick at the pick quantity prompt. When the selector hears the stop number announced, it is an indication that there will be more than one pick from this slot. In addition, the MC will say, "remain at slot" before speaking the pick quantity prompt. Multi-stop picks are discussed. If the objects to pick are catch weight items, the MC prompts for the catch weight of each item.

Figure 15:
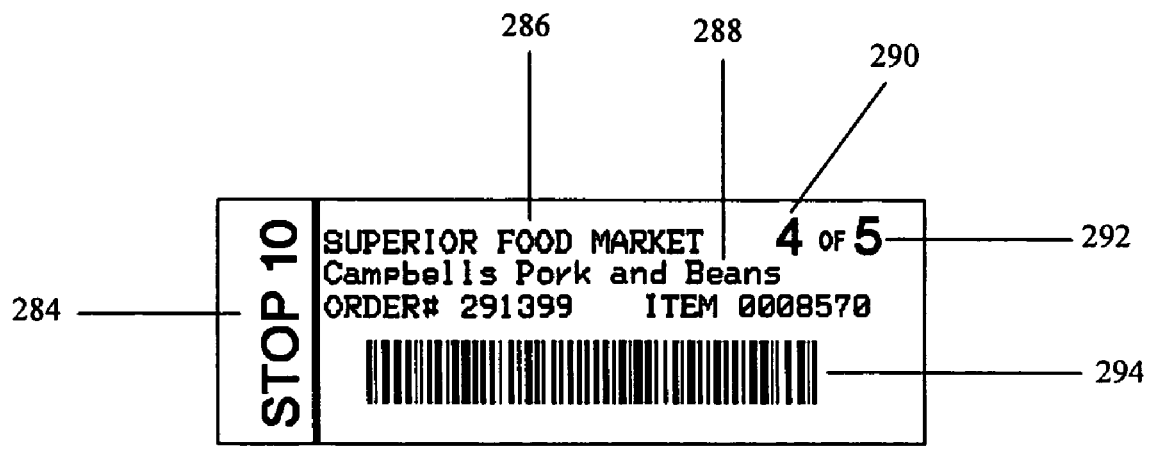
FIG. 15 is an object that can be printed using the method of the example.

If object labels are to be printed, they start to print on the belt-mounted printer at approximately the same time the pick quantity prompt is announced. The format of an object label is shown below. If the object to pick is a catch-weight item, object labels are not printed when the pick quantity prompt is spoken. Catch weight case labels are printed as the individual catch weights are entered. The basic format of the object label is shown on FIG. 15. FIG. 15 is a typical label that is printed and attached to a selected object. The label shows the following data:

The stop number (284) where the object will be delivered;

The name of the stop (286) where the object will be delivered;

The description of the object (288) being selected;

The specific object number (290) being selected;

The total number of objects of this type (292) that are to be selected from the location; and A barcode (294) that uniquely identifies the object.

The name of the delivery store is printed across the top line. To the right of the delivery store is printed the object number and the total objects ordered (i.e. 4 of 5). Below the delivery store (on the second line) is the item description. On the third line is printed the customer order number and the item or product number. Below the order number and the item number is the object label bar code. The bar code that is printed for each object label may contain 6 fields, such as order number—about 6 digits, product number—about 7 digits, daily sequence number—about 4 digits, sequence counter—about 1 digit, label type—about 1 character (i.e. C or M), object number—about 3 digits.

On the far left side of the object label (printed vertically) is typically the stop number. If the item is a catch weight item, the catch weight is printed immediately below the order number.

If the objects to be picked are objects for which a catch weight must be recorded, the MC prompts for the catch weight of each of those objects. If object labels are to be printed, an individual object label is printed for each object as its catch weight is entered. Once all the catch weights for the slot have been entered, the MC automatically proceeds to the next slot or aisle. When the selector is required to record the catch weight, the MC announces the following prompt: "Catch weight? Is {Catch weight} correct?".

The selector must say the catch weight and then say "ready". Catch weights have a format of "xxx.xx". Thus, the largest catch weight that may be entered is 999.99. The selector is not required to say all 5 digits. If the catch weight for an item was 12.5, the selector should say "one two point five ready". When a catch weight is entered, the MC repeats the catch weight and asks if the catch weight is correct. The selector should either say "yes" to accept the catch weight or say "no" to reject it and reenter it. The MC automatically formats the catch weight with a decimal and two decimal digits. Thus if the selector must enter a catch weight of 14.00, the selector may say "one four ready", "one four point ready", "one four point zero ready" or "one four point zero zero ready". All four values will be converted by the MC to "14.00". Note, if the selector is ever unsure as to what catch weight digits have been spoken, the selector may always say "repeat" to clear the digits, repeat the catch weight prompt and start over.

While the MC is waiting for the selector to enter the catch weight, there are a number of keywords the selector may speak in order to obtain additional information regarding the pick. This information includes the current location (slot number), the stop number for the pick, the object description and the UPC number.

Once the catch weight has been entered, the MC checks to see if there are additional items to pick from this slot. If so, the MC repeats the above prompt until the selector has entered a catch weight for each object picked from the slot. Note, although it should not be necessary, the MC screen indicates which catch weight object is being picked (i.e. 2 of 5) and may be reviewed if necessary.

If the weight for an object is not available, the selector may say "missing weight" to bypass the catch weight entry. When the selector says "missing weight", the MC asks if he is sure. The selector may say either "yes" to record the fact that no weight was available or "no" to cancel the missing weight request and reenter the catch weight. If the selector indicates that the catch weight is missing, no object label is printed since the weight is not yet available. When the assignment is completed, the selector is asked to weigh those objects that did not have a weight entered and enter their weight at that time. When the weight is entered, the object label is printed.

While this invention has been described with emphasis on the preferred embodiments, it should be understood that within the scope of the appended claims the invention might be practiced other than as specifically described herein.

What is claimed is:

1. A method for objects selection at a location comprising:
   a. using a mobile computer having a bar code reader, a display an audio output device, a tactile input device, text to speech software, a voice recognition software, objects selection applications software, and radio frequency identification (RFID) reader wherein said mobile computer is adapted for communication between an order systems server and a user and the order systems server is adapted for communication between the mobile computer and at least one external computer system;
   b. entering a user code and security password to log onto the mobile computer;
   c. training the voice recognition software by the user;

d. providing instructions to the user from the objects selection applications software using the text to speech software to the audio output device and providing information from the objects selection applications software to the display;
e. transmitting a request from the mobile computer to the order systems server to obtain a list of objects to be pulled;
f. using the applications software to generate a summary of the objects to be pulled from the list;
g. displaying the summary on the display;
h. providing the summary using via the text to speech software to the audio output device;
i. performing a step which is a member of the group: acknowledging the summary by the user using the tactile input device and acknowledging the summary using the audio input device;
j. instructing the user to go to an aisle using the text to speech software;
k. acknowledging the user is at the aisle using the voice recognition software;
l. advising the user using the text to speech software to go to:
  i. a location of objects which is part of the list of objects;
  ii. a location of a case of objects;
  iii. a location of an individual objects;
m. acknowledging the user is at the location using the voice recognition software;
n. with the mobile computer, inputting a member of the group:
  i. the check digits for an object's location by the user using voice recognition software;
  ii. the bar code of an object's location by the user using the bar code reader;
  iii. the bar code of a case of objects by the user using the bar code reader;
  iv. the bar code of an individual object by the user using the bar code reader;
  v. the objects location with the RFID reader;
  vi. the case of objects with the RFID reader; and
  vii. the individual object with the RFID reader;
o. using the voice recognition software by the user to verify the check digits for a objects location;
p. using the applications software to verify the barcode or RFID is for the location of the objects, case of objects, or individual object;
q. using the text to speech software to indicate the quantity of the objects needed via the audio output device to the user;
r. acknowledge the indicated quantity of the objects;
s. repeating steps (j) through (q) until all objects on the list have been selected;
t. providing an acknowledgement to the order systems server the results of the process steps (b) through (r); and
u. transferring the results from the order systems server to the at least one external computer system.

2. The method of claim 1, wherein the acknowledgement word is "ready".

3. The method of claim 1, further comprising the step of using the mobile computer to obtain status information for the user that is an indication of the user's performances compared to the expected completion time for steps (b) through (r).

4. The method of claim 1, further comprising a step wherein if indicated quantity of the objects is less than the quantity of objects to be pulled, the user uses the voice recognition software to indicate a need to "pick short" the indicated amount.

5. The method of claim 4, further comprising the step after the user indicates the need to "pick short", the applications software via the text to speech software prompts the user to provide an input on:
  a. the actual quantity of objects pulled; and
  b. the reason for the lack of quantity.

6. The method of claim 5, further comprising a step after the actual quantity of objects pulled and the reason for the lack of quantity of acknowledging the input from the user using text to speech software.

7. The method of claim 1, further comprising the step of alerting the user using the text to speech software that an object to be pulled is a "catch weight item".

8. The method of claim 7, wherein the user indicates the weight of the catch weight item using the audio input device.

9. The method of claim 8, wherein weight of the catch weight item is verified using the text to speech software.

10. The method of claim 1, wherein the mobile computer can also indicate a transport device and a position on the transport device where the quantity of the objects to be pulled should be placed.

11. The method of claim 1, wherein the mobile computer provides a "high quantity item" alert via the display to the user after the summary information is provided to the user.

12. The method of claim 10, wherein answers to a series of safety questions are required from the user regarding the transport vehicle used to move the transport device which can be is selected from the group comprising:
  a. are the brakes working?;
  b. is the horn working?;
  c. is the steering working?;
  d. is there any damage to the transport vehicle?
  e. is there any leak in the transport vehicle?;
  f. are the tires inflated and undamaged?; and
  g. are the forks undamaged?.

13. The method of claim 1, wherein at any time during the method, a second user can contact the user from a remote location via the order systems server, which communicates with the mobile computer which then provides the communication via audio output device and display.

* * * * *